United States Patent [19]

Schmidhuber et al.

[11] Patent Number: 5,028,089
[45] Date of Patent: Jul. 2, 1991

[54] RIGID LID FOR A SLIDING ROOF OR SLIDING-LIFTING ROOF OF AN AUTOMOBILE

[75] Inventors: Karl Schmidhuber, Alzenau; Takashi Sakaguchi, Mömbris; Horst Böhm, Frankfurt, all of Fed. Rep. of Germany

[73] Assignee: Rockwell-Golde G.m.b.H., Fed. Rep. of Germany

[21] Appl. No.: 270,896

[22] Filed: Nov. 14, 1988

[30] Foreign Application Priority Data

Nov. 18, 1987 [DE] Fed. Rep. of Germany ....... 3739082

[51] Int. Cl.⁵ .............................................. B60J 7/043
[52] U.S. Cl. .................................................. 296/216
[58] Field of Search ................ 296/216, 210, 218, 221

[56] References Cited

U.S. PATENT DOCUMENTS 4,418,956 12/1983 Yamamoto et al. ................ 296/216

FOREIGN PATENT DOCUMENTS 1555555 10/1977 Fed. Rep. of Germany .
3535126 4/1989 Fed. Rep. of Germany .
0194980 8/1987 Japan .................................... 296/210

Primary Examiner—Charles A. Marmor
Assistant Examiner—Richard Camby

[57] ABSTRACT

A rigid lid for a sliding roof or a sliding-lifting roof, the lid having a lid shell, provided with a peripheral 90° cranked edge, is painted separately from the other parts of the roof construction constituting a pre-assembled unit and is not installed until the pre-assembled unit has been installed into the bodywork of the automobile. The lid shell is secured by detent engagement to the reinforcing frame or to a holding frame fixed thereto after positioning and under the action of force from above. The edge gap sealing profile is secured to the reinforcing frame by pushing on from below before the lid shell is fitted.

4 Claims, 6 Drawing Sheets

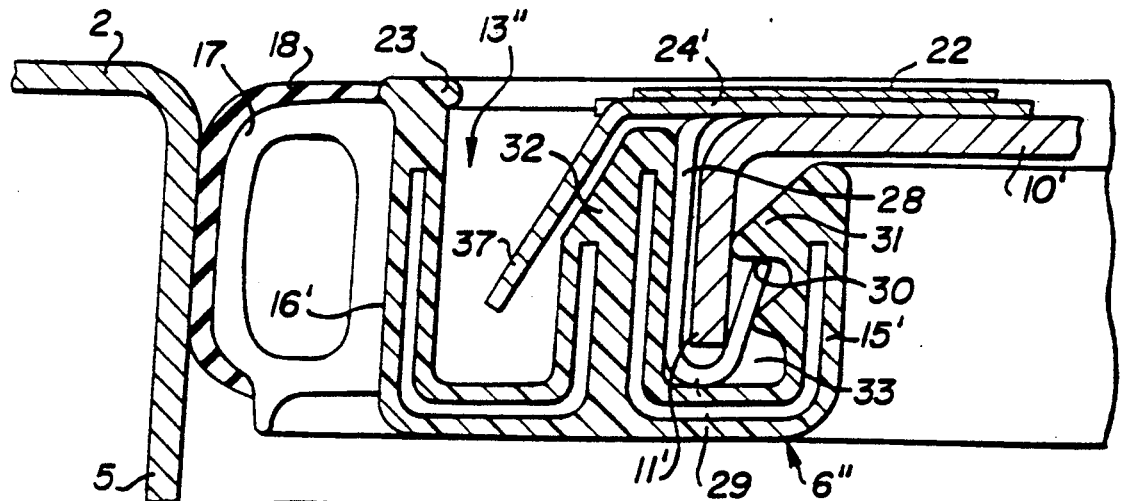
_Fig-10_
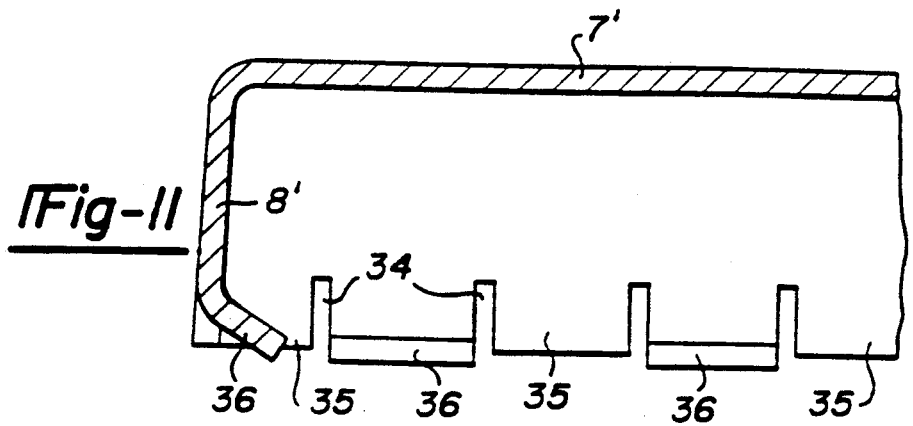
_Fig-11_
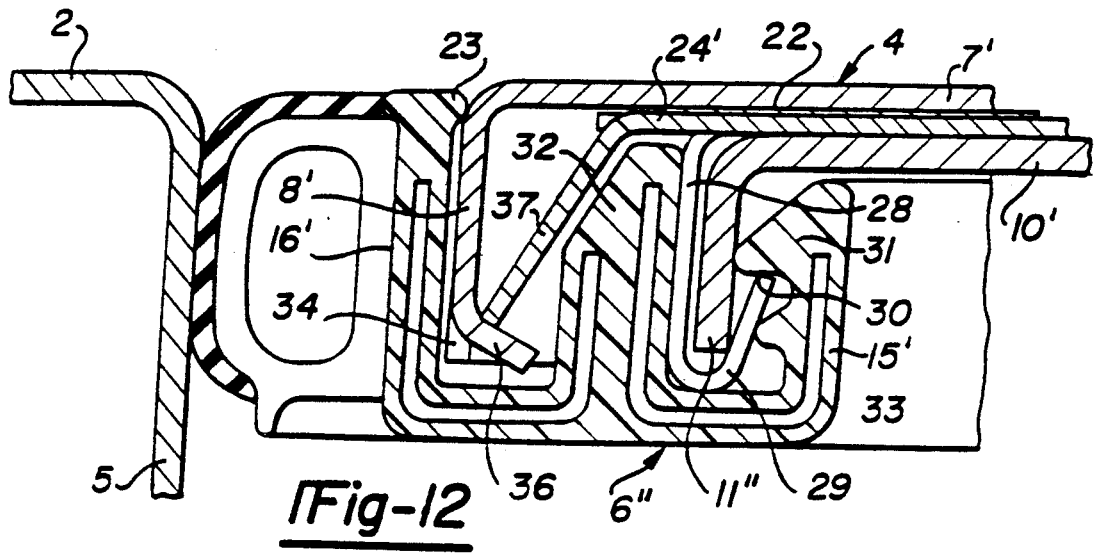
_Fig-12_

RIGID LID FOR A SLIDING ROOF OR SLIDING-LIFTING ROOF OF AN AUTOMOBILE

FIELD OF THE INVENTION

This invention relates to a rigid lid for a sliding roof or sliding-lifting roof.

DESCRIPTION OF PRIOR ART

In a known rigid sliding lid (DE-PS 15 55 555) a reinforcing frame consists of four separate components, namely a front and a rear reinforcing profile and two lateral bearing plates for the attachment of the sliding lid to the functional components of the sliding roof construction. The four parts are directly connected, by their downwardly orientated flanges, to the cranked edges of the lid shell by welding and the edge gap sealing profile is pushed with clamping action from below onto the lid edge formed of the cranked edges of the lid shell and of the flanges of the four parts of the reinforcing frame.

In a further, known sliding roof construction (DE-PS 35 35 126) the reinforcing frame is formed in one piece and is provided on all four sides with downwardly orientated flanges and is again secured, by its downwardly orientated flanges, to the peripheral cranked edge of the lid shell. In this known sliding roof construction, an edge gap sealing profile, which is pushed from below onto the lid edge, is secured in its position by a holding frame screwed from below to the reinforcing frame, which holding frame for this purpose engages with a peripheral horizontal edge into an additional groove of the edge gap sealing profile.

The aforementioned, known rigid sliding lids have proved very satisfactory in respect of their relevant fields of use, but often leave something to be desired in respect of the assembly of the sliding roofs or sliding-lifting roofs equipped with them, especially in the production line of the automobile manufacturer. In both these known forms of lid, the lid is a part of a sliding roof or sliding-lifting roof unit pre-assembled ready for installation, consisting of the roof frame to be fitted beneath the roof opening with all the functional parts disposed thereon and of the painted, rigid lid, furnished with the edge gap sealing profile. During roof assembling, the roof frame is introduced into the automobile body and fixed to its roof part. Then the rigid lid must be placed from above into the roof opening and then be screwed to the functional components of the roof construction situated on the roof frame. This connecting of the rigid lid with the other parts of the roof construction requires a manual operation, because the fixing components are not disposed within the access range of a modern automatic assembly device. In an otherwise fully automatic production line, this manual assembly operation is troublesome and time-consuming.

OBJECT OF THE INVENTION

The object of the present invention therefore is so to provide a rigid lid of the above-described type that, during the assembly of the roof, its fitting no longer needs to be carried out by hand, but can be left to automatic assembly machines.

SUMMARY OF THE INVENTION

According to one aspect of the present invention, there is provided a rigid lid for a sliding roof or sliding-lifting roof of an automobile which, in its closed position, sealingly closes a roof opening by means of an edge gap sealing profile continuous around all four sides, and which consists of a lid shell which is provided on all four sides with cranked edges of equal height and of a reinforcing frame, the reinforcing frame being provided on all four sides with flanges which are oriented downwardly and parallel to the cranked edges when the lid shell is fitted on the reinforcing frame, the edge gap sealing profile being pushed onto the cranked edges and flanges to fit around them with a clamping action, and there being detent elements provided both at the cranked edges of the lid shell and at the flanges of the reinforcing frame, which detent elements can be engaged with one another by pushing the lid shell onto the reinforcing frame.

According to another aspect of the present invention, there is provided a rigid lid for a sliding roof or sliding-lifting roof of an automobile which, in its closed position, sealingly closes a roof opening by means of an edge gap sealing profile continuous around all four sides, and which consists of a lid shell which is provided on all four sides with cranked edges of equal height and of a reinforcing frame, the reinforcing frame being provided on all four sides with flanges which are orientated downwardly and parallel to the cranked edges when the lid shell is fitted in position, the edge gap sealing profile being pushed onto the cranked edges and flanges to fit around them with clamping action, and there being a holding frame between the lid shell and the reinforcing frame, the holding frame being fixed to the reinforcing frame and being equipped with downwardly orientated flanges extending parallel to the cranked edges of the lid shell and the flanges of the reinforcing frame, there being detent elements both at the cranked edges of the lid shell and at the flanges of the holding frame which detent elements can be engaged with one another by pushing-on of the lid shell onto the holding frame connected with the reinforcing frame.

The invention also extends to an automobile incorporating a sliding roof or sliding-lifting roof having a rigid lid essentially as defined in either of the two preceding paragraphs.

According to the basic concept of the present invention, the lid shell is a component separate from the other parts of the roof construction, which has received the desired application of paint together with the bodywork and which is not installed by placing in from above and simple engagement with the detent elements of the reinforcing frame or the detent elements of the holding frame until after assembling of all the other components of the roof construction to a pre-assembled unit and securing of this pre-assembled unit in the vehicle body. The cranked edges of the lid shell, also furnished with detent elements, are here pushed into an upwardly open groove of the edge gap sealing profile, already secured to the reinforcing frame or to the reinforcing frame and the holding frame. After assembly, which can be readily carried out by automatic assembly machines, and which requires no further fixing measures to be executed from the inside of the vehicle body, the lid shell is now unreleasably connected with the reinforcing frame or reinforcing frame/holding frame assembly respectively.

By the invention, a complete pre-assembling of the roof construction without lid shell to form one pre-assembled unit is facilitated, which unit includes also the reinforcing frame with edge gap sealing profile or the reinforcing frame/holding frame assembly with edge gap sealing profile respectively, with the result that the alignment of the roof frame, which is a component of the pre-assembled unit, relative to the roof opening is facilitated.

BRIEF DESCRIPTION OF THE DRAWINGS

For a better understanding of the invention, and to show how the same may be carried into effect, reference will now be made, by way of example, to the accompanying drawings, in which:

FIG. 10 is a section through part of a second example of embodiment of the second form of construction taken along the line II-II in FIG. 1, but without lid shell, FIG. 11 is a corresponding section through the associated lid shell, and FIG. 12 is a section corresponding to FIG. 10, but with the lid shell in position.

DESCRIPTION OF THE PREFERRED EMBODIMENTS

Figure 1:
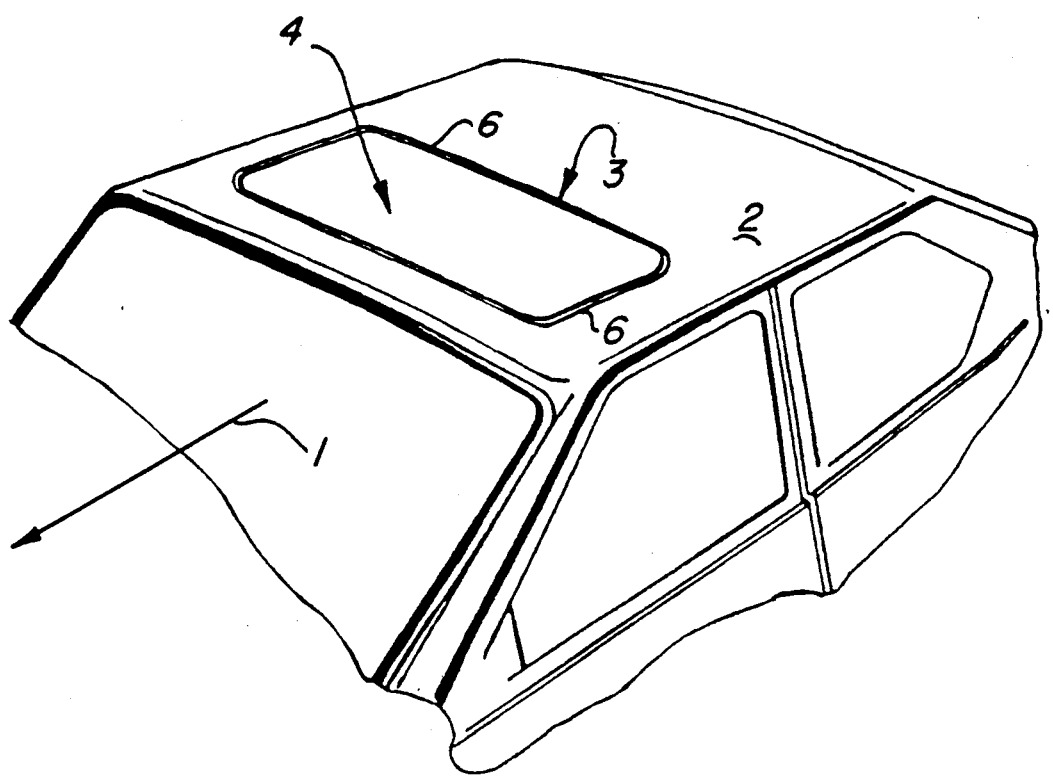
FIG. 1 is a perspective view of part of a roof of a passenger car with an installed sliding roof or sliding-lifting roof with a rigid lid thereof being shown closed.

In the drawings, the forms of construction and examples of embodiment of the rigid lid are shown substantially schematically, the sectional views of FIGS. 2 to 7 and 10 to 12 being larger than full-size, while all the other Figures are reductions. In the sectional views shown in FIGS. 2, 4, 5, 7, 9, 10 and 12, the components of the automobile roof and a hollow chamber portion of the edge gap sealing profile are illustrated purely schematically in full lines and without hatching although they are sectional views. The hollow chamber portion is shown without deformation, which however it actually undergoes in bearing against the cranked edge of the automobile roof.

The automobile roof illustrated in FIG. 1 forms part of a passenger car, the forward direction of travel of which is indicated by the travel direction arrow 1. In the front region, in respect of this forward direction of travel, of the fixed roof surface 2 of the vehicle roof, there is a roof opening 3, in which the rigid lid, illustrated in all the Figures in the closed position and referenced generally by the reference numeral 4, is situated. The lid 4 is sealed against the vertical cranked edge 5 (e.g. FIG. 2) of the fixed roof surface 2 by the edge gap sealing profile referenced 6. For the remainder, in the succeeding description of the forms of construction and examples of embodiment, mutually corresponding components bear the same reference numbers.

Figure 4:
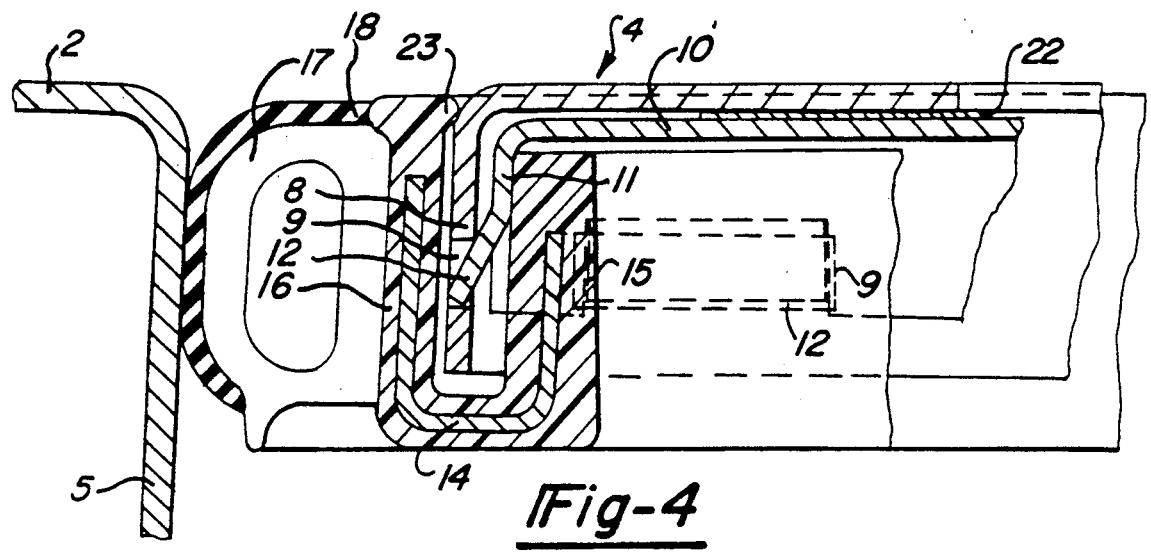
FIG. 4 is a section corresponding to FIG. 2, but with the lid shell in position.
Figure 3:
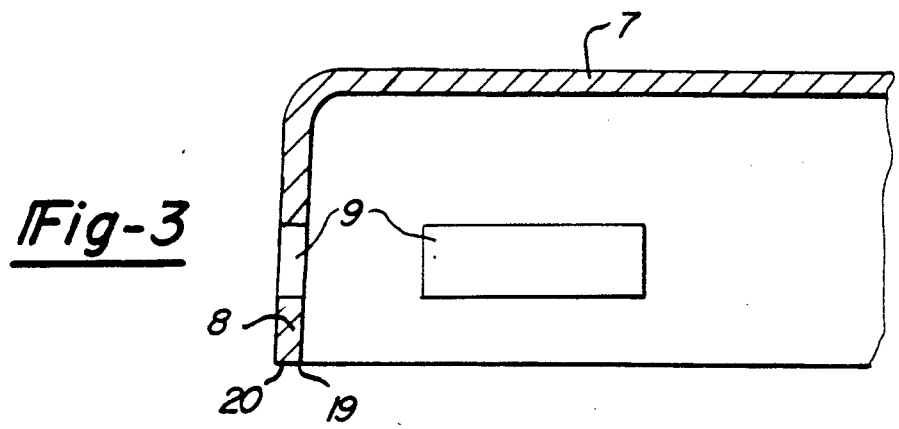
FIG. 3 is a corresponding section through the associated lid shell.
Figure 2:
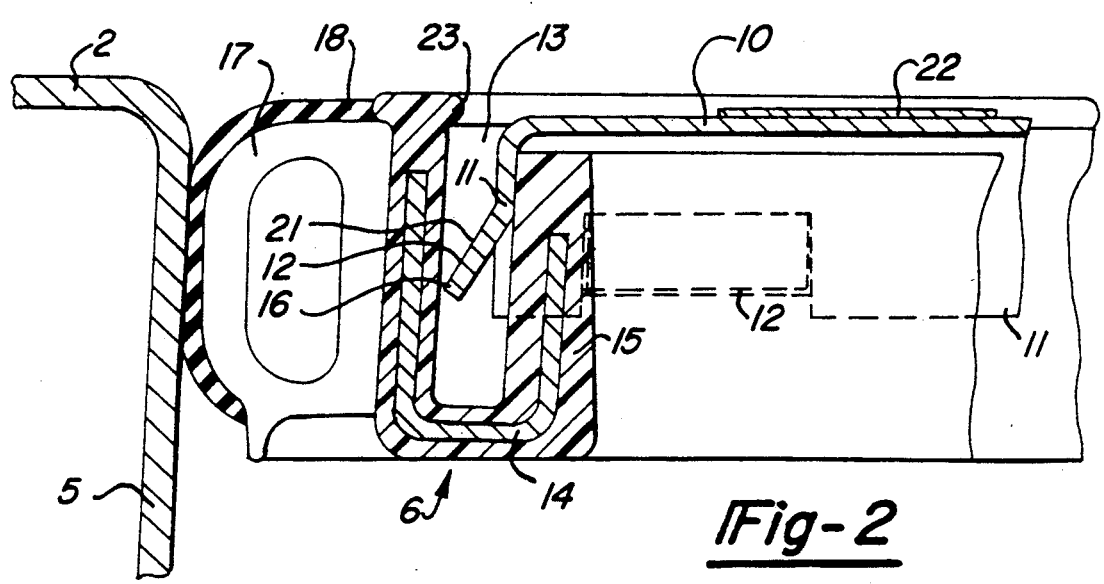
FIG. 2 is a section through part of a first form of construction taken along the line II-II in FIG. 1, but without lid shell.

To explain the first form of construction, reference is now made to FIGS. 2 to 4. From FIGS. 3 and 4, a lid shell 7 can be seen which is furnished on all four sides with a 90°. cranked edge 8. The cranked edge 8 possesses a constant flange height around the entire periphery of the lid shell 7. In the cranked edge 8 there are situated, distributed in a row around the periphery, a plurality of window-like apertures 9, forming detent elements, the function of which will be explained later.

From FIG. 2, a single-piece reinforcing frame 10 can be seen, which is furnished around its periphery with downwardly orientated flanges 11, extending parallel to the cranked edge 8 of the lid 4. The flanges 11 have, at their lower edge, detent elements in the form of resilient detent tongues 12, bent outwards from them and orientated downwards. The detent tongues 12 are situated at the locations of the apertures 9 in the cranked edge 8, i.e. they are opposite these when the lid shell 7 is in position, so that when the lid shell is in position they engage into the apertures 9 and form a non-releasable connection between the lid shell 7 and the reinforcing frame 10.

The edge gap sealing profile 6 possesses, in its cross-hatched fixing portion, a substantially U-shaped section with an upwardly open groove 13 and in the usual way is made from an elastic material having a stiffening inlay 14 of sheet metal following the cross-sectional shape. The edge gap sealing profile 6 is so designed in respect of the reinforcing frame 10 that its inner arm 15 bears against the flanges 11 from below after it is pushed on. At the contact surfaces between the flanges 11 and the inner arm 15, an adhesive connection may be provided.

The outer arm 16 of the edge gap sealing profile 6 is longer than the inner arm 15 thereof and is connected on its outer face with the elastically deformable hollow chamber portion 17. The hollow chamber portion 17 is provided, over the greater part of its external periphery, with a brush-like fibre layer 18, as indicated in FIGS. 2 and 4.

The reinforcing frame 10, together with the edge gap sealing profile 6 mounted thereon, is a component of a pre-assembled unit, which includes also the roof frame (not shown) and the functional components (not shown) of the roof construction. When this pre-assembled unit is secured underneath the fixed roof surface 2 of the automobile body, the reinforcing frame 10 with the edge gap sealing profile 6 mounted thereon are situated in the position shown in FIG. 2.

The last installation step for the rigid lid 4 only consists in introducing the lid shell 7 with its cranked edge 8 into the groove 13 of the edge gap sealing profile 6, until the inner arris 19 of the lower surface 20 of the cranked edge 8 meets the downwardly inclined oblique surfaces 21 of the detent tongues 12. If a suitable force is now applied from above onto the lid shell 7. then the inner arris 19 slides on the oblique surfaces 21, causing the detent tongues 12 to deflect resiliently inwards, before they engage with their lower ends into the apertures 9 of the cranked edge 8.

After complete engagement (FIG. 4), the inclined surfaces 21 of the detent tongues 12 bear against the upper inner arrises of the apertures 9, the mutually facing horizontal surfaces of the reinforcing frame 10 and of the lid shell 7 simultaneously bearing against each other. In this manner, the lid shell 7 is rigidly fixed without play to the reinforcing frame 10.

This fixing situation is still further improved by the provision of a soft interlay 22, which advantageously is formed of a plastics sheet adhesive on at least one face, in the edge region between the lower face of the lid shell 7 and the upper face of the reinforcing frame 10. Before the fitting of the lid shell 7, the interlay 22 may be glued onto the upper surface of the reinforcing frame 10, as shown in FIG. 2. The interlay 22 ensures that the lid shell 7 and the reinforcing frame 10 bear against each other without clatter. If the material of the interlay 22 is so selected that the interlay 22 is at least partly elastically deformed when the detent tongues 12 engage into the apertures 9, then the interlay ensures, in addition to the engagement described between the detent tongues 12 and the apertures 9, an elastic prestress between the components firmly connected together, i.e. the lid shell 7 and the reinforcing frame 10. Penetration of water into the groove 13 after the lid shell has been installed is prevented by an inwardly pointing lip 23 on the outer arm 16 of the profile strip 6, which bears elastically against the lid shell 7 when the latter is pressed into position.

In the second form of construction shown in FIGS. 5 to 12 in two different examples of embodiment, a holding frame 24, 24' respectively is situated between the lid shell 7, 7' respectively and the reinforcing frame 10', which holding frame is firmly connected to the reinforcing frame 10, 10' in a manner to be described. If the external dimensions of the rigid lid 4 corresponding to the second form of construction are assumed to be the same as those of the first form of construction, the reinforcing frame 10' will have smaller external dimensions than those of the first form of construction, on account of the presence of the holding frame 24, 24'. Furthermore, there are no detent elements in the form of detent tongues or apertures in the flanges 11' of the reinforcing frame 10'.

To explain the first example of embodiment of the second form of construction, reference is first made to FIGS. 5 to 9. The holding frame 24 seen here is likewise provided on account of the presence of the holding frame 24, 24'. Furthermore, there are no detent elements in the form of detent tongues or apertures in the flanges 11' of the reinforcing frame 10'.

To explain the first example of embodiment of the second form of construction, reference is first made to FIGS. 5 to 9. The holding frame 24 seen here is likewise provided with downwardly orientated flanges 25, extending parallel to the cranked edges 8 of the lid shell 7 and the flanges 11' of the reinforcing frame 10'. The flanges 25 possess the same flange depth around the entire periphery of the holding frame 24. On the flanges 25 there are detent elements in the form of outwardly bent detent tongues 26, which correspond in form and function to the detent tongues 12 described in relation to the first form of construction. They co-operate with the apertures 9 in the cranked edge 8 of the lid shell 7 in the same manner as has been described in relation to the first form of construction.

Figure 7:
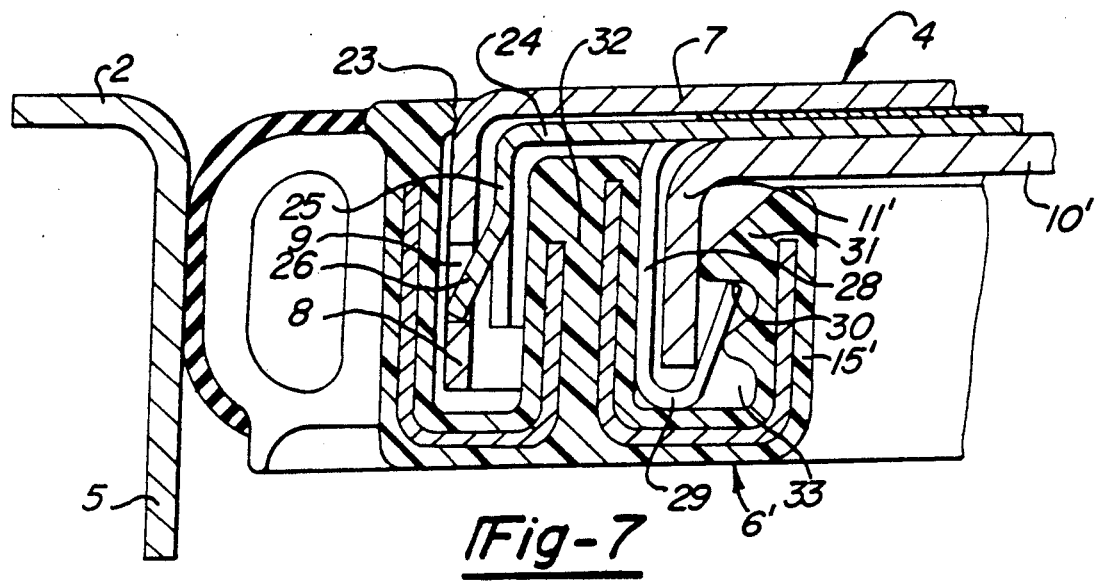
FIG. 7 is a section corresponding to FIG. 5, but with the lid sheel in position.
Figure 6:
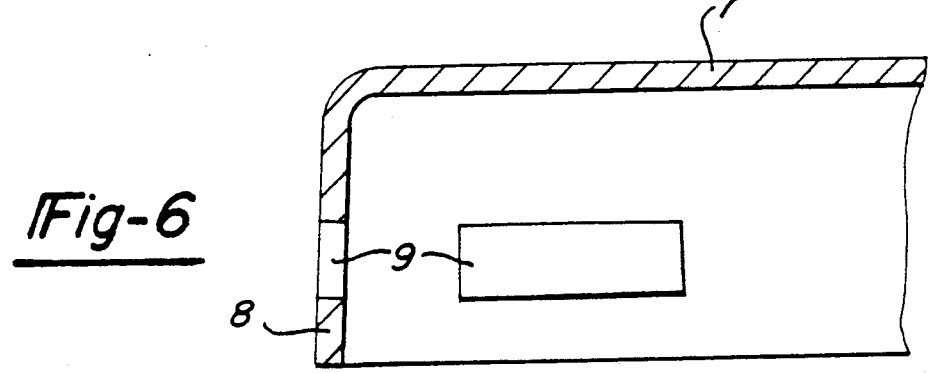
FIG. 6 is a corresponding section through the associated lid shell.
Figure 5:
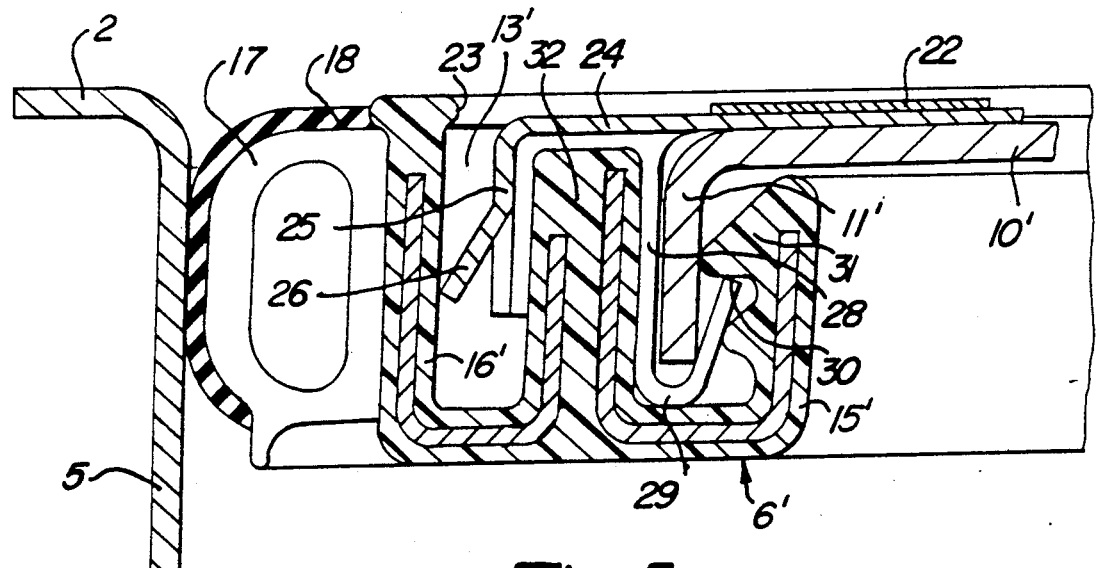
FIG. 5 is a section through part of a first form of embodiment of a second form of construction along the line II—II in FIG. 1, but without lid shell.
Figure 8:
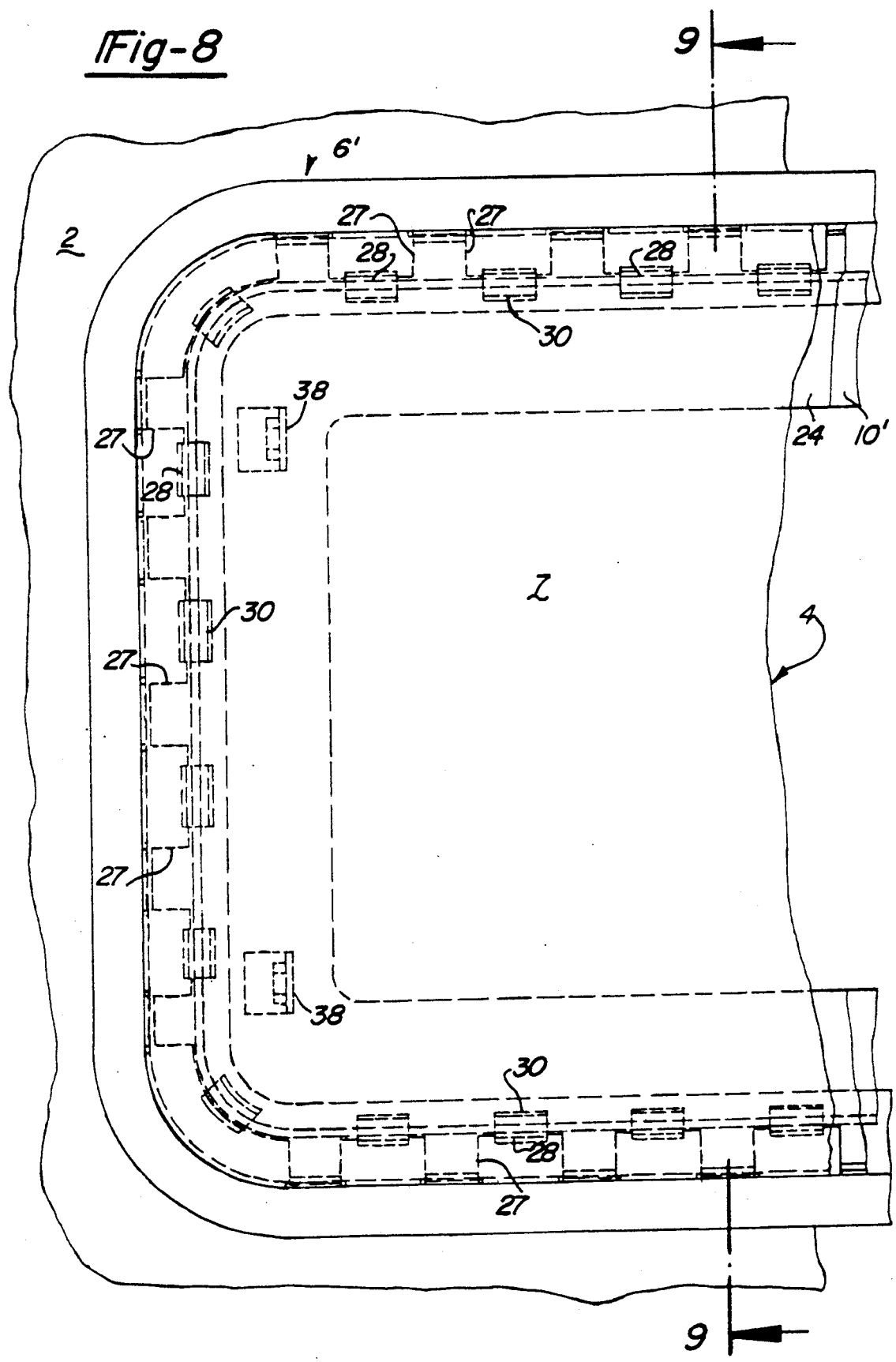
FIG. 8 is a plan view of the part of the example of embodiment shown in FIGS. 5 to 7.
Figure 9:
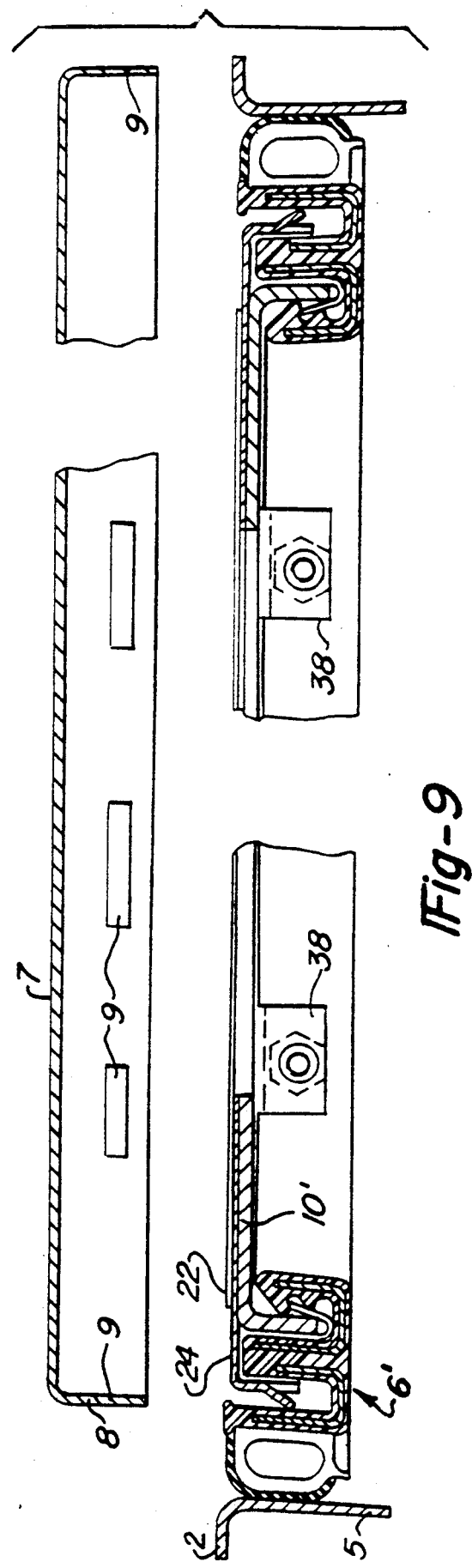
FIG. 9 is a section taken on the line IX—IX in FIG. 8 with lid shell shown immediately before placing in position.

The flanges 25 of the holding frame 24 are interrupted around the periphery of the holding frame at regular intervals by cut-outs 27 (FIG. 8) including at the corners, from which fixing tongues 28 are bent out downwards perpendicularly and bent again obliquely upwards as hooks at 29, as can be seen from FIGS. 5, 7 and 9. The hook-like bent portions of the fixing tongues 28 are bent around the lower edges of the flanges 11' of the reinforcing frame 10', causing the reinforcing frame 10' to be firmly connected without play to the holding frame 24. The obliquely upwardly bent ends of the fixing tongues 28 project sufficiently far inwards from the flanges 11', for upwardly orientated detent projections 30 to be formed, which can be engaged with associated projections 31 of the relevant edge gap sealing profile 6'.

The fixing portion of the edge gap sealing profile 6' has a generally W-shaped cross-section with three approximately parallel arms, of which the outer arm 16' bears against the cranked edge 8 of the lid shell 7 from outside with its lip 23, the middle arm 32 is pushed in between the flanges 25 of the holding frame 24 and the flanges 11' of the reinforcing frame, and the inner arm 15' bears from outside with its projection 31 against the flange 11' of the reinforcing frame 10'. The edge gap sealing profile 6' is accordingly provided with two upwardly open grooves 13' and 33. Into the groove 13' engage the flanges 25 of the holding frame 24 and, after assembly is completed (FIG. 7), the cranked edge 8 of the lid shell 7. Into the groove 33 engage both the fixing tongues 28 of the holding frame 24 and also the flanges 11' of the reinforcing frame 10'.

Similarly to the manner described in relation to the first form of construction shown in FIGS. 2 to 4, after the pre-assembled unit of the roof construction has been fitted into the body of the vehicle, the reinforcing frame 10' and the holding frame 24, firmly connected thereto by the fixing tongues 28, are situated in the position shown in FIG. 5 with reference to the fixed roof surface 2 and its vertical cranked edge 5. Furthermore, the edge gap sealing profile 6' is, as described, pushed from below onto the frame unit consisting of reinforcing frame 10' and holding frame 24, the strip-shaped peripheral projection 31 of the edge gap sealing profile 6' being engaged with the detent projections 30 of the fixing tongues 28. In this manner, the edge gap sealing profile 6' is firmly connected with the frame unit 10', 24 before the lid shell 7 is fitted.

The fitting of the lid shell 7 takes place analogously to the description given with reference to the first form of construction shown in FIGS. 2 to 4. Here, the cranked edge 8 of the lid shell 7 is pushed or pressed into the groove 13' until the detent tongues 26 engage unreleasably into the apertures 9 of the cranked edge 8 of the lid shell 7. The soft interlay 22, which also may be of plastics sheet, adhesive on one side at least, and also of elastic construction, is now situated between the lower face of the lid shell 7 and the upper face of the holding frame 24.

In addition to the described fixing of the holding frame 24 to the reinforcing frame 10', the two frames may be connected together, for example by welding, at their upper surfaces bearing against one another. This applies also to the second example of embodiment of the second form of construction to be described in greater detail below. For this, reference is made to FIGS. 10 to 12.

In this example of embodiment, the cranked edge 8' of the lid shell 7' is divided from below at equal intervals by slits 34 into lugs 35 and 36, of which the lugs 36 are bent inwards to form detent elements, while the lugs 35, shorter by comparison, form the lower end of the vertical edge 8' extending from the lid shell 7. The detent elements of the holding frame 24' associated with the inwardly bent lugs 36 are formed by spring tongues 37, which instead of the flanges 25 and associated detent tongues 26 of the first example of embodiment of the second form of construction described in relation to FIGS. 5 to 9 are disposed on the holding frame 24' by bending into an obliquely, downwardly inclined direction. The spring tongues 37 do not need to have the width provided between adjacent cut-outs 27 (FIG. 8). The same is true, of course, also for the detent tongues 26 of the first example of embodiment. If the lid shell 7' is now introduced from above into the groove 13" of the edge gap sealing profile 6", then the bent lugs 36 slide on the external oblique surfaces of the spring tongues 37, the latter deflecting resiliently inwards. The spring tongues spring out again as soon as the bent lugs 36 pass beneath the lower edge of the spring tongues 37. This occurs when the lid shell 7' comes into bearing, with its inner surface, against the upper surface of the holding frame 24' or against the inserted interlay 22. The sprung-back spring tongues 37 bear against the bent-over lugs 36 and thus connect the lid shell 7' firmly to the holding frame 24' and, of course, also to the reinforcing frame 10'. As in the case of the hitherto described detent elements, this engagement is also unreleasable. In this second example of embodiment also of the second form of construction, the edge gap sealing profile 6" is engaged, by a projection 31 extending all around on the inner profile arm 15', onto detent projections 30, which are provided on fixing tongues 28, bent out like hooks from the holding frame 24'.

From FIGS. 8 and 9, for example, the fitting of connecting elements 38 to the reinforcing frame 10' can be seen, which serve for the mounting of the reinforcing frame on the functional components (not illustrated) of the sliding roof or sliding-lifting roof construction.

We claim:

1. A rigid lid for a sliding roof or sliding-lifting roof of an automobile which roof has a closed position in which it sealingly closed a roof opening, the lid having four sides with an edge gap sealing profile continuous around all the four sides, a lid shell provided on all four sides with cranked edges of equal height, and a reinforcing frame, the reinforcing frame being provided on all four sides with flanges which are orientated downwardly and parallel to the cranked edges when the lid shell is fitted on the reinforcing frame, the reinforcing frame extending parallel to and substantially continuously with said lid shell to define a two ply structure, the edge gap sealing profile being pushed onto the cranked edges and flanges to fit around them with clamping action, and detent elements being provided both at the cranked edges of the lid shell and at the flanges of the reinforcing frame, said detent elements can be engaged with one another by pushing the lid shell onto the reinforcing frame.

2. A lid according to claim 1, wherein the detent elements at the cranked edges of the lid shell are formed as apertures and the detent elements at the flanges of the reinforcing frame are formed as resilient detent tongues, bent out from the flanges and oriented downwards, which can be engaged into the apertures.

3. A lid according to claim 1, wherein a soft interlay is laid in the edge region between the lower surface of the lid shell and the upper surface of the reinforcing frame.

4. A lid according to claim 3, wherein the soft interlay is a plastics sheet with adhesive on at least one side.

* * * * *